2,720,512

CYANO ETHER-ESTERS OF ACRYLIC ACID AND POLYMERS

John Mann Butler, Dayton, Ohio, assignor to Monsanto Chemical Company, St. Louis, Mo., a corporation of Delaware No Drawing. Application February 16, 1953,
Serial No. 337,241

18 Claims. (Cl. 260—88.7)

The present invention relates to unsaturated cyano ether-esters, to polymers thereof, to modification of said polymers by vulcanization and to the vulcanized products thus obtained.

According to the invention there are provided new and valuable cyanoethoxypropyl or cyanoethoxybutyl acrylates of the formula

$$CH_2:CH.COOCH_2(CH_2)_nCH_2OCH_2CH_2CN$$

in which $n$ is 1 or 2.

I have found that compounds having the above formula are readily prepared by contacting acrylic acid, an acid halide thereof such as acrylyl chloride or acrylyl bromide or acrylic anhydride in the presence of an esterifying catalyst, with a hydroxyalkoxynitrile selected from the class consisting of 4-(2-cyanoethoxy)-1-butanol and 3-(2-cyanoethoxy)-1-propanol. These hydroxyalkoxynitriles are easily obtainable by the addition reaction of acrylonitrile and 1,4-butanediol or 1,3-propanediol.

Cyano ethers-esters provided by the invention are 4-(2-cyanoethoxy)butyl acrylate and 3-(2-cyanoethoxy)propyl acrylate. Preparation of the present esters is effected by contacting the 4-(2-cyanoethoxy)-1-butanol or the 3-(2-cyanoethoxy)-1-propanol with acrylic acid, acrylyl chloride, acrylyl bromide or acrylic anhydride in the presence of an acidic or basic esterifying catalyst, and advantageously in the presence of a polymerization inhibitor, and maintaining the resulting reaction mixture, at ordinary or increased temperatures until formation of the cyanoethoxybutyl or cyanoethoxypropyl acrylates has taken place. The present esters may also be prepared by ester interchanging, e. g., by reaction of a suitable alkyl acrylate with a suitable cyanoalkoxyalkyl ester such as 4-(2-cyanoethoxy)butyl acetate. Advantageously, refluxing temperatures of the reaction mixture are employed. Esterifying catalysts which may be used are organic or inorganic acids or basic materials such as sulfuric acid, hydrochloric acid, benzenesulfonic acid, potassium hydroxide, sodium acetate, sodium methoxide, pyridine, etc.

The present cyanoethoxypropyl or cyanoethoxybutyl acrylates are generally clear, rather high boiling liquids which may be employed for a wide variety of industrial and agricultural purposes; but they are particularly valuable as new polymerizable or copolymerizable monomers. When subjected to polymerizing conditions they yield soft, rubbery products which, I have found, may be vulcanized to give rubbers of extremely good low-temperature flexibility and solvent-resistant properties. Mixtures of the present cyanoalkoxy alkyl esters with compounds containing the vinyl ($CH_2:CH—$) radical, e. g., vinyl chloride, styrene, acrylonitrile, etc., also may be subjected to polymerizing conditions to yield improved copolymers.

I have found that when the present comparatively stable cyano ether-esters are subjected to polymerizing conditions, they are readily converted into soft, rubbery homopolymers resembling natural rubber or the known synthetic rubbers. The present soft rubbers can be compounded with the well-known fillers such as carbon black, zinc oxide and the like, vulcanization agents such as sulfur, p-quinone dioxime, polymeric p-dinitrosobenzene, or with other cross-linking agents having known vulcanizing effect on vinyl and dienic polymers, in the presence or absence of vulcanization accelerators, to give vulcanized rubbers which are distinguished by possessing the property of remaining elastic at even low temperatures and of resisting attack by hydrocarbon and other solvents. Vulcanized rubbers provided by the present invention are of particular utility in the fabrication of molded products, e. g., gaskets and packings, designed for use in the aircraft and automotive industries wherein there is required high resistance against hydrocarbon oils and greases, brake fluids, hydraulic fluids, etc., and flexibility at very low temperatures.

The new polymers may be prepared by any of the several polymerization methods known to the art, i. e., in mass, solution or emulsion; but the emulsion polymerization method is the most effective. In the practice of the emulsion polymerization technique monomers are contacted in the presence of water which contains dissolved therein a suitable peroxy catalyst and preferably an emulsion stabilizing agent. If desired, all of the monomer may be charged to the polymerization reactor at the beginning of the reaction, or may be added periodically, or gradually throughout the course of the reaction. Similarly, the catalyst and emulsifying agent may also be introduced either at the start or in increments during the reaction. The preferred method of conducting the polymerization involves adding the monomer gradually to a reaction vessel maintained under the desired conditions for polymerization.

Emulsion polymerizations are catalyzed by means of any water soluble peroxy compound, for example sodium peroxide, hydrogen peroxide, sodium perborate, the sodium salts of other peroxy acids, the potassium, ammonium and other water soluble compounds containing a peroxy radical. The quantity of peroxy compound may be from 0.05 to 2.0 per cent by weight of the polymerizable compound. The catalyst may be charged at the beginning of the reaction or it may be added continuously or in increments throughout the course of the reaction for the purpose of maintaining a more uniform concentration of catalyst in the reaction mass. The latter method is preferred because it tends to make the resultant polymer more uniform in physical and chemical properties.

Although the uniform distribution of the reactants throughout the reaction mass can be achieved by vigorous agitation alone, it is generally desirable to promote the uniform distribution of reagents by using wetting agents, or emulsion stabilizers. Suitable agents for this purpose are the water soluble salts of fatty acids, such as sodium oleate, and potassium stearate, mixtures of water soluble fatty acid salts, such as the common soaps prepared by the saponification of animal and vegetable oils, the "amino soaps" such as triethanol amine and dodecylmethylamine, salts of rosin acids and mixtures thereof, the water soluble salts of half esters of sulfuric acid and long chain alkyl alcohols, sulfonated hydrocarbons such as alkylarylsulfonates, and any other of the wide variety of wetting agents, which are in general organic compounds containing both hydrophobic and hydrophilic radicals. The quantity of emulsifying agent will depend upon the particular agent selected, the nature of monomer to be used, and the conditions of polymerization. In general, however, from 0.1 to 5 percent by weight of the monomer may be employed.

The emulsion polymerization reactions are conducted at temperatures between 20 and 100 C., and preferably between 40–60° C. The polymerization temperatures should be maintained substantially constant, and the rate of addition of the monomer so regulated as to maintain this condition. Under such conditions optimum quantity and quality of the product are obtained.

The reaction is preferably initiated by charging the reactor with water containing the catalyst and emulsifier in solution, and thereafter adding the monomer gradually at rates which enable the maintenance of a constant temperature. In order to avoid unduly high concentrations of emulsifier in the reaction mass at the beginning of the reaction most of it may be mixed with the monomer and added therewith during the reaction. Preferably, only a small proportion of the catalyst is charged at the beginning of the reaction and the remainder is added either continuously or intermittently throughout the course of the reaction. The preferred manner of operation involves heating the water containing a small amount of catalyst and emulsifier to approximately the ultimate polymerization temperature and initiating the reaction by introducing the stream of mixed monomers.

The emulsion polymerizations are conducted in glass or glass-lined vessels, which are provided with means for agitating the contents thereof. Generally, rotary stirring devices are the most effective means of insuring the intimate contact of the reagents, but other methods may successfully be employed, for example by rocking or tumbling the reactor. The polymerization equipment generally used is conventional in the art and the fundamental consideration involved in the selection of the equipment is the type of reaction contemplated.

Vulcanization of the polymeric 3-(2-cyanoethoxy)-propyl or 4-(2-cyanoethoxybutyl)acrylate may be effected by methods customarily employed in vulcanizing natural rubber or synthetic rubbery products obtained by polymerization of dienic and/or vinyl compounds, e. g., butadiene, mono-olefinic-dienic mixtures such as the styrene-butadiene copolymer commonly known as GRS, the butene-butadiene (mainly butene) copolymer commonly known as butyl rubber, polyvinyl chloride, polyvinylidene chloride, copolymers of vinyl chloride and vinylidene chloride or acrylonitrile, polymeric esters of acrylic or methacrylic acid such as polymeric ethyl acrylate, etc. The present soft, rubbery polymeric esters may be compounded, e. g., on cold rolls with a known vulcanizing agent such as sulfur, a polymerized trimethyl dihydroquinoline, diethylenetriamine, p-quinone dioxime, alkali-metal hydroxides, etc., fillers such as carbon black, clay, and zinc oxide and other generally employed vulcanizing adjuvants, promoters, antioxidants, etc., such as the amine-aldehyde, guanidine, benzothiazyl, or thiocarbamate type vulcanization accelerators to give products which upon curing, i. e., heating at ordinary or superatmospheric pressures at temperatures of, say, from 150° C. to 400° C. are converted to rubbers of very good mechanical strength, elasticity, solvent resistance and low-temperature flexibility.

Useful vulcanization recipes employed for conversion of the polymeric 3-(2-cyanoethoxy)propyl or the polymeric 4-(2-cyanoethoxy)butyl acrylate into vulcanized rubbers are those customarily employed in the art for the vulcanization of natural or synthetic rubbery materials. Some typical vulcanizing recipes which may be used with the present polymers are the following (parts by weight):

I

| | Parts |
|---|---|
| Polymer | 100 |
| Zinc oxide | 10 |
| Thiurad | 1 |
| Mercaptobenzothiazole | 0.5 |
| Sulfur | 2 |
| Carbon black | 30 |

II

| | |
|---|---|
| Polymer | 100 |
| Zinc oxide | 10 |
| Thiurad | 1 |
| Mercaptobenzothiazole | 0.5 |
| Sulfur | 2 |
| Carbon black | 60 |
| Stearic acid | 1.5 |

III

| | |
|---|---|
| Polymer | 100 |
| Carbon black | 30 |
| Zinc oxide | 5 |
| Acetone-p-amino-biphenyl reaction product | 2 |
| p-Quinonedioxime | 5 |
| Red lead | 5 |
| Stearic acid | 5 |

IV

| | |
|---|---|
| Polymer | 100 |
| Carbon black | 30 |
| Lead dioxide | 30 |
| Dinitrosobenzene type rubber adjuvant | 5 |

In recipes III and IV, the combination of the lead compound and p-quinone dioxime or the p-dinitrosobenzene adjuvant replaces sulfur as the vulcanizing agent.

The present invention is further illustrated, but not limited, by the following examples:

*Example 1*

4-(2-cyanoethoxy)-1-butanol, B. P. 126° C./1 mm. to 123° C./less than 1 mm., $n_D^{25}=1.4475$ was prepared by adding 543 g. (10.25 M) of acrylonitrile to a mixture of 3690 g. (41 M) 1,4-butanediol and 25.6 cc. of choline during a time of 2 hours while controlling the temperature of the reaction mixture at about 40° C., maintaining the reaction mixture at this temperature for an additional 20 hours, and fractionating the resulting product at reduced pressure.

Esterification of the 4-(2-cyanoethoxy)-1-butanol was effected by charging a 5-liter pot, equipped with a Dean-Stark water trap and stirrer, as follows:

4-(2-cyanoethoxy)-1-butanol, 500.5 g. (3.5 M)
Toluene, 600 cc.
Glacial acrylic acid, 324 g. (4.5 M)
Pyrogallol, 4 g.
Benzenesulfonic acid, 6 g.

The above charge was heated to reflux, and water was removed as it collected. An additional 10 g. of benzenesulfonic acid was added during an approximately 2-hour heating period, and a total of 69 cc. of water was collected. After heating for the 2 hours, the mixture was allowed to stand at room temperature for 36 hours, then cooled to 0–10° C. To the cooled reaction mixture there was then added 650 cc. of benzene and 350 cc. of a saturated sodium chloride solution, and any unreacted acid was neutralized by treatment with 125 g. of anhydrous sodium carbonate in 25 g. portions. The whole was filtered, and the aqueous layer which formed in the filtrate was separated. After washing the aqueous layer with two 75 cc. portions of cold, saturated sodium chloride solution, water and solvents were stripped at reduced pressure and the residue was fractionated to give 565 g. (81.8% yield) of the substantially pure 4-(2-cyanoethoxy)butyl acrylate, B. P. 135°–140° C./2 mm. $n_D^{25}$ 1.4517.

*Example 2*

Into a reaction vessel equipped with a mechanical stirrer and attached to a closed system there were charged 275 g. of water, 0.25 g. of an alkyl sulfate-type emulsifier, and 0.20 g. of sodium bisulfite. This charge was brought to a temperature of 41° C. in a nitrogen atmosphere and then during a time of 1.25 hours there was added continuously 100 g. of the 4-(2-cyanoethoxy)butyl acrylate of Example 1 and 15 cc. of a catalyst mixture consisting of 25 g. of water, 0.04 g. of potassium persulfate and 0.75 g.

of the emulsifier. During the next 45 minutes, heating at from 41.0°–43.4° was conducted while the remainder of the catalyst mixture was introduced in 3 portions at 15-minute intervals. The whole was then maintained at 41.0°–60.2° C. for 2.5 hours. At the end of that time the resulting white emulsion was cooled and poured through a filter into a 1 per cent aluminum sulfate solution. The resulting solution was warmed to about 75° C. in order to complete coagulation and the coagulated mass was washed by kneading under water. After vacuum drying (60° C.) of the washed product there was obtained 98.3 g. of the soft, rubbery polymeric 4-(2-cyanoethoxy)butyl acrylate.

*Example 3*

This example shows the vulcanization of the polymeric product of Example 2.

The polymeric 4-(2-cyanoethoxy)butyl acrylate was compounded on cold rolls as follows:

100 parts polymer
30 parts carbon black
3 parts stearic acid
2 parts acetone-p-aminobiphenyl reaction product antioxidant
5 parts zinc oxide
5 parts p-quinone dioxime
5 parts red lead Vulcanization of the compounded mixture was effected at 300 p. s. i. and 175° C. for 1.75 hours, with a cooling pressure of 600 p. s. i. Test specimens cut from the resulting vulcanizate had the following properties as determined by the American Society for Testing Materials Procedures D638–46T, D412–41 and D445–46 and the Clash-Berg method for stiffness vs. temperature tests:

| | |
|---|---|
| Tensile strength | 248 p. s. i. |
| Tensile elongation | 350% |
| $T_f$ | Minus 45.1° C. |
| $T_{2000}$ | Minus 14.8° C. |
| Stifflex range | 30.3° C. |

*Example 4*

The polymer of Example 2 was also vulcanized employing the following recipe:

| | Parts |
|---|---|
| Polymer | 100 |
| Carbon black | 30 |
| Lead dioxide | 30 |
| "Polyac" accelerator [1] | 5 |

[1] A commercially available product consisting 30% of p-dinitrosobenzene polymer and 70% inert mineral filler.

Curing of the resulting compound was effected at 175° C. for 45 minutes with a cooling pressure of 600 p. s. i. Evaluation of the cured product employing the testing procedures of Example 3 gave the following values:

| | |
|---|---|
| Tensile strength | 333 p. s. i. |
| Tensile elongation | 250% |
| $T_f$ | Minus 46° C. |
| $T_{2000}$ | Minus 23.8° C. |
| Stifflex range | 22.2° C. |

*Example 5*

The polymer of Example 2 was vulcanized using the following recipe:

100.0 parts polymer
60.0 parts carbon black
10.0 parts zinc oxide
0.5 part mercaptobenzothiazole
2.0 parts sulfur
1.0 part thiurad
1.5 parts stearic acid Curing of the milled mixture was effected at 175° C. for 1.5 hours at 300 p. s. i., with a cooling pressure of 600 p. s. i. The resulting vulcanized rubber had a tensile elongation of 350 per cent, $T_f$=minus 45° C. and a Stifflex range of 30° C. as determined by the evaluation procedures of Example 3.

*Example 6*

This example compares the vulcanizate of Example 4 to several commercially available vulcanizates with respect to resistance against attack by hydraulic fluids. Testing was conducted according to the procedure of the American Society for Testing Materials, Designation 471–49T wherein a test sample of the material to be tested is immersed in the fluid for 70–72 hours at a temperature of 100° C. and the weight and volume of the test sample noted. In the present instance, the following hydraulic fluids were used:

(1) An ester base hydraulic fluid known to the trade as "Skydrol."
(2) A petroleum base hydraulic fluid.

Test results thus obtained are summarized below:

| Vulcanizate Tested | Volume and Weight Percent Increase After Immersion in— | | | |
|---|---|---|---|---|
| | (1) | | (2) | |
| | vol. | wt. | vol. | wt. |
| Example 4 | 42.3 | 30.5 | 0.2 | 0.2 |
| "Butyl" rubber | 44.5 | 59.5 | 204.0 | 141.0 |
| GRS rubber | 120.7 | 118.9 | 105.9 | 76.7 |
| Hycar | 216.3 | 231.9 | 7.53 | 5.52 |
| Acrylon | 249.9 | 203.3 | 10.66 | 3.77 |

What I claim is:

1. A compound having the formula $$CH_2:CH.COOCH_2(CH_2)_nCH_2OCH_2CH_2CN$$

in which $n$ is an integer of from 1 to 2.

2. 4-(2-cyanoethoxy)butyl acrylate.
3. 3-(2-cyanoethoxy)propyl acrylate.
4. A polymer of a compound having the formula $$CH_2:CH.COOCH_2(CH_2)_nCH_2OCH_2CH_2CN$$

in which $n$ is an integer of from 1 to 2.

5. Polymeric 4-(2-cyanoethoxy)butyl acrylate.
6. Polymeric 3-(2-cyanoethoxy)propyl acrylate.
7. The process which comprises contacting an alcohol selected from the class consisting of 4-(2-cyanoethoxy)-1-butanol and 3-(2-cyanoethoxy)-1-propanol with an acid compound selected from the class consisting of acrylic acid, acrylyl chloride, acrylyl bromide and acrylic anhydride in the presence of an esterifying catalyst and recovering from the resulting reaction product an acrylate selected from the class consisting of 4-(2-cyanoethoxy)-butyl acrylate and 3-(2-cyanoethoxy)propyl acrylate.

8. The process which comprises heating 4-(2-cyanoethoxy)-1-butanol with acrylic acid in the presence of an esterifying catalyst and a polymerization inhibitor and recovering 4-(2-cyanoethoxy)butyl acrylate from the resulting reaction product.

9. The process which comprises heating 3-(2-cyanoethoxy)-1-propanol with acrylic acid in the presence of an esterifying catalyst and a polymerization inhibitor and recovering 3-(2-cyanoethoxy)propyl acrylate from the resulting product.

10. The process of preparing a rubbery product which comprises heating an emulsion of an ester having the formula $$CH_2:CH.COOCH_2(CH_2)_nCH_2OCH_2CH_2CN$$

in which $n$ is an integer of from 1 to 2.

11. The process of preparing a rubbery product which comprises heating an emulsion of 4-(2-cyanoethoxy)butyl acrylate.

12. The process of preparing a rubbery product which comprises heating an emulsion of 3-(2-cyanoethoxy)-propyl acrylate.

13. The process of preparing a solvent-resistant, low-temperature-resistant synthetic rubber which comprises preparing a polymer by heating an emulsion of an acrylate selected from the class consisting of 3-(2-cyanoethoxy)-propyl acrylate and 4-(2-cyanoethoxy)butyl acrylate, and vulcanizing the polymer thus prepared by compounding it with a rubber vulcanizing agent selected from the group consisting of sulfur, quinone dioxime and dinitrosobenzene, and heating the compounded mixture to effect vulcanization.

14. The process of preparing a solvent-resistant, low-temperature-resistant synthetic rubber which comprises preparing a polymer by heating an emulsion of 4-(2-cyanoethoxy)butyl acrylate, and vulcanizing the polymer thus prepared by compounding it with a rubber vulcanizing agent selected from the group consisting of sulfur, quinone dioxime and dinitrosobenzene, and heating the compounded mixture to effect vulcanization.

15. A solvent-resistant, low-temperature-resistant synthetic rubber comprising a vulcanized mixture of a polymer selected from the class consisting of polymer 3-(2-cyanoethoxy)propyl acrylate and 4-(2-cyanoethoxy)butyl acrylate and a vulcanizing agent selected from the class consisting of sulfur, quinone dioxime and dinitrosobenzene.

16. A solvent-resistant, low-temperature-resistant synthetic rubber comprising a vulcanized mixture of polymeric 4-(2-cyanoethoxy)butyl acrylate and a vulcanizing agent selected from the class consisting of sulfur, quinone dioxime and dinitrosobenzene.

17. The process of preparing a solvent-resistant, low-temperature-resistant synthetic rubber which comprises preparing a polymer by heating an emulsion of 4-(2-cyanoethoxy)butyl acrylate, and vulcanizing the polymer thus prepared by compounding it with dinitrosobenzene and heating the compounded mixture to effect vulcanization.

18. A solvent-resistant, low-temperature-resistant synthetic rubber comprising a vulcanized mixture of polymeric 4-(2-cyanoethoxy)butyl acrylate and dinitrosobenzene.

References Cited in the file of this patent

UNITED STATES PATENTS

| | | |
|---|---|---|
| 2,129,694 | Izard | Sept. 13, 1938 |
| 2,458,888 | Rehberg | Jan. 11, 1944 |
| 2,634,203 | Mowry et al. | Apr. 7, 1953 |